Patented Dec. 17, 1929

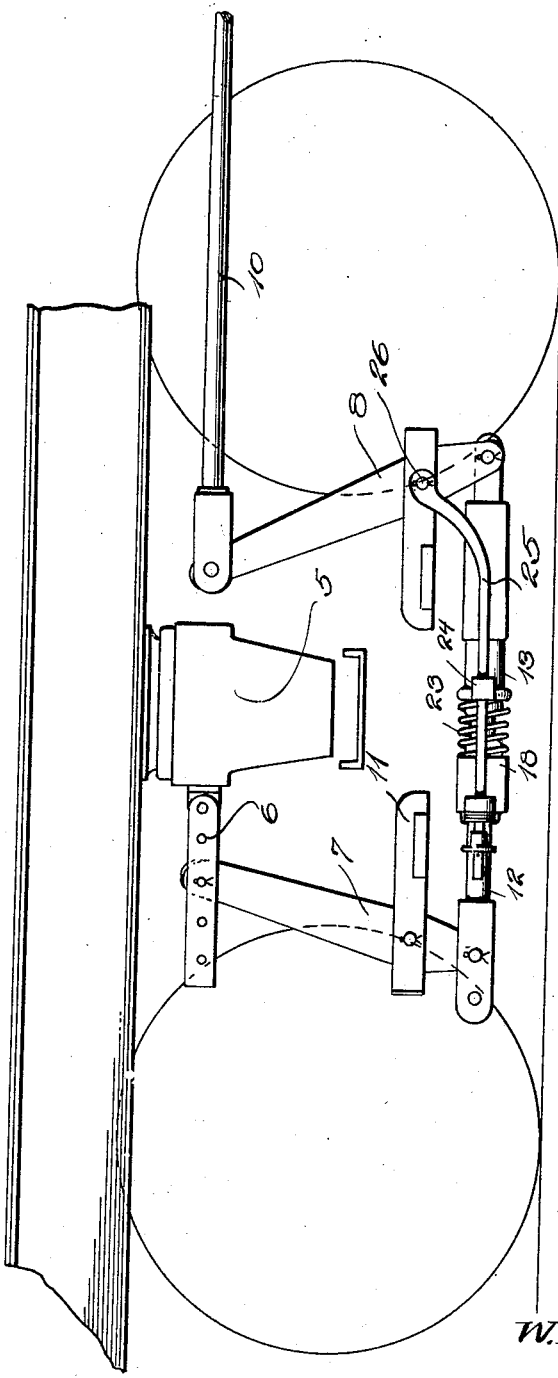

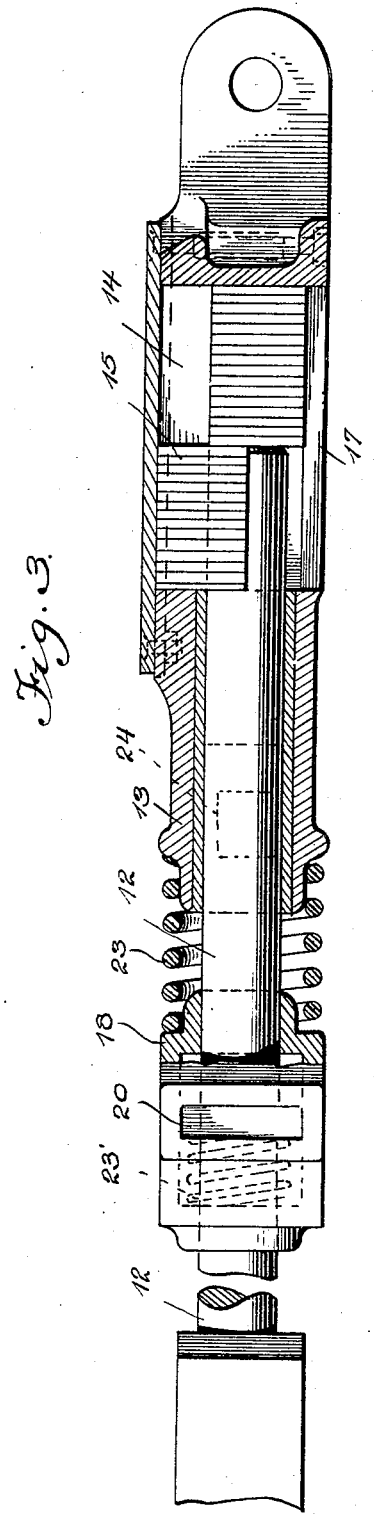
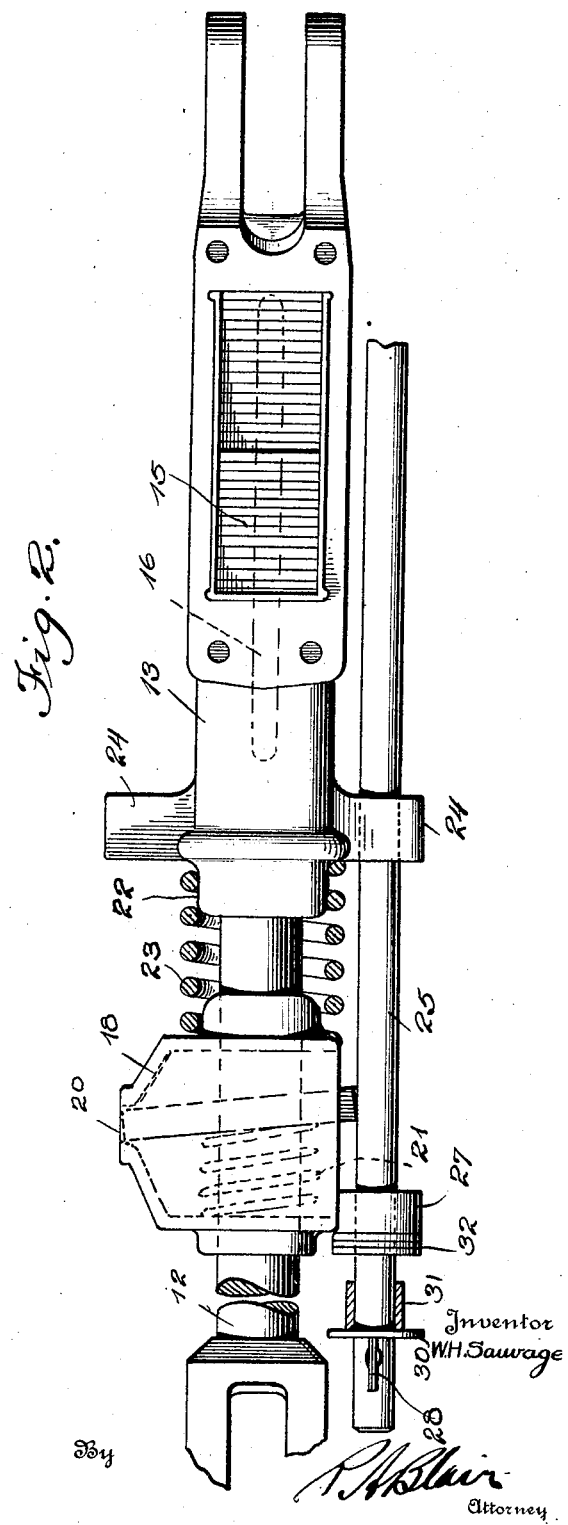

1,739,694

UNITED STATES PATENT OFFICE

WILLIAM H. SAUVAGE, OF NEW YORK, N. Y., ASSIGNOR, BY MESNE ASSIGNMENTS, TO GOULD COUPLER COMPANY, OF NEW YORK, N. Y.

SLACK ADJUSTER

Application filed February 9, 1925. Serial No. 7,957.

This invention relates to improvements in slack adjusters and more particularly to automatic slack adjusters particularly adapted for use in connection with the truck brake rigging of railway cars, although it is to be understood that various features thereof are applicable to other installations of brake rigging where the effective length of an element thereof is adapted to be changed, for example.

One of the objects of the present invention is to provide a simple and practical slack adjuster mechanism which will be highly efficient in use and operation.

A further object is to provide a strong and durable slack adjuster mechanism particularly adapted for application to substantially all types of bottom rods of truck brake rigging now in general use.

A further object is to provide a positively acting slack adjuster which will automatically take up and hold the excess slack at each complete operation of the brakes.

Other objects will be in part obvious from the annexed drawings and in part indicated in connection therewith by the following analysis of this invention.

The invention accordingly consists in the features of construction, combination of parts and in the unique relation of the various members and in the relative proportioning and disposition thereof, all as more clearly outlined herein.

To enable others skilled in the art so fully to comprehend the underlying features thereof that they may embody the same by numerous modifications in structure and relation contemplated in this invention, drawings depicting a preferred form have been annexed as a part of this disclosure, and in such drawings like characters of reference denote corresponding parts throughout all the views, in which Figure 1 is a vertical elevational view partially in section showing such parts of the slack adjuster and associated brake rigging and truck as are necessary to understand the same;

Figure 2 is a plan view of a slack adjuster; and

Figure 3 is a vertical sectional view.

Referring now to the drawings in detail, 5 indicates a truck bolster provided with an adjustable hanger 6 at one side, to which the upper end of a dead lever 7 is pivotally secured. At the opposite side of the bolster is a live lever 8 actuated through a pull rod 10 connected with any suitable source of power such as the hand brake mechanism or air brake cylinder. Both of these levers 7 and 8 carry brake beams 11 intermediate their ends, and the lower ends are pivotally connected to a two-part telescopic push rod constituting the slack adjuster mechanism shown more in detail in Figures 2 and 3. This mechanism, broadly speaking, includes a rod-like member 12 telescoping within a tubular member 13. Associated with this tubular member is a permanent take up and holding device, which, in the present form, comprises a chamber 14 having a plurality of shims 15 of somewhat U-shaped construction, for example, such as shown in Figure 2 of my Patent No. 1,020,519 of March 19, 1912, normally resting over and upon the top of the rod 12, but as this bar or rod moves outwardly from the chamber 14 they drop down between the end of the rod 12 and the end wall of the chamber, as clearly shown in Figure 3. The rod 12 is preferably slotted as at 16 and likewise the underside of the chamber 14 is slotted at 17, whereby a flat sheet of metal or wood may be inserted through the bottom of the chamber or rod to raise the shims upwardly whereby the rod 12 may be pushed in by hand when it is desired to restore the parts to normal position, as, for example, when the worn brake shoes are to be replaced.

Adjacent the barrel member 13 is a pick up dog or temporary adjusting mechanism 18, which preferably has one relatively heavy dog 20. This dog consists of a rectangular sheet of metal having an opening through which the rod 12 passes and is normally held in canted position by means of spring 21. Interposed between the housing 18 and a flange 22 at the end of the tubular member 13 is a relatively heavy compression spring 23. It will also be noted that the barrel member 13 is provided with perforated ears 24 at each side which permit this barrel to be either a "right" or "left" barrel as occasion may require.

Positioned substantially parallel to the parts above described is an adjusting rod 25, one end of which is connected at 26 to the live lever 8 and the other end of which, after passing through lug 24, passes through a lug 27 projecting from the temporary take up housing 18. The end of this rod is slotted as at 28 to receive a key acting against the washer 30. A sleeve 31 surrounds the end of the rod and one or more washers 32 are interposed between this sleeve and the lug 27 thereby to vary the lost motion or brake shoe clearance usually required.

The operation of the device above described is substantially as follows: On ordinary operation of the brakes, the live lever 8 is moved to the right on application thereof, and reacts through the slack adjuster to the dead lever 7 to bring the brake shoes carried by the beams 11 into engagement with the peripheries of the wheels. On excess travel exceeding the normal, the adjusting rod comes into operation to move the temporary take up mechanism contained within the housing 18 relatively towards the right, thereby compressing the spring 23. On release of the brakes, this spring expands, and the take up dog 20, having a biting or positive engagement with the rod 12, will force the same outwardly from the barrel member 13 an amount corresponding to this excess travel, thereby allowing one or more of the shims 15 to drop down between the end of the rod and the end wall of the chamber. This operation is repeated every time excess travel occurs, as is necessary in order to insure uniform piston travel and absorb all of the slack due to excess wear of the parts as it occurs. When it is necessary to replace worn brake shoes, the shims are raised in the manner above described and the rod 12 forced inwardly to normal position.

From the above it will be seen that the present invention contemplates a highly reliable and efficient slack adjuster mechanism well adapted to accomplish among others all of the objects and advantages hereinafter set forth.

Without further analysis the foregoing will so fully reveal the gist of this invention that others can by applying current knowledge readily adapt it for various applications without embodying certain features that from the standpoint of the prior art fairly constitute essential characteristics of the generic or specific aspects of this invention, and, therefore, such adaptations should and are intended to be comprehended within the meaning and range of equivalency of the following claims.

I claim:

1. In an apparatus of the character described, in combination, a two-art telescopic push rod adapted to have its effective length varied for permanently taking up and holding the excess travel, and means for holding the push rod in its newly adjusted position comprising a plurality of shims, a housing formed in one of the parts of the push rod within which said shims are located, the cooperating part of said push rod being provided with a slot beneath the shims whereby said shims may be raised on insertion of a member through said slot to permit relative movement of one part with respect to the other part of said push rod.

2. In an apparatus of the character described, in combination, a two-part telescopic push rod comprising a barrel member and a rod, a housing formed in the barrel member, a plurality of shims in said housing normally resting upon the rod and adapted to drop down between the end of a rod and the end wall of the housing as the effective length of said rod is increased, the underside of said housing being provided with an opening through which a flat member may be inserted for raising the shims to permit the rod to be moved inwardly with respect to the tubular member.

3. In an apparatus of the character described, in combination, a two-part telescopic push rod comprising a barrel member and a rod, a housing formed in the barrel member, a plurality of shims in said housing normally resting upon the rod and adapted to drop down between the end of a rod and the end wall of the housing as the effective length of said rod is increased, the underside of said housing being provided with an opening through which a flat member may be inserted for raising the shims to permit the rod to be moved inwardly with respect to the tubular member, the end of said rod also being slotted to correspond with a slot in the bottom wall of said housing.

Signed at New York city this 8th day of January, 1925.

WILLIAM H. SAUVAGE.